UNITED STATES PATENT OFFICE.

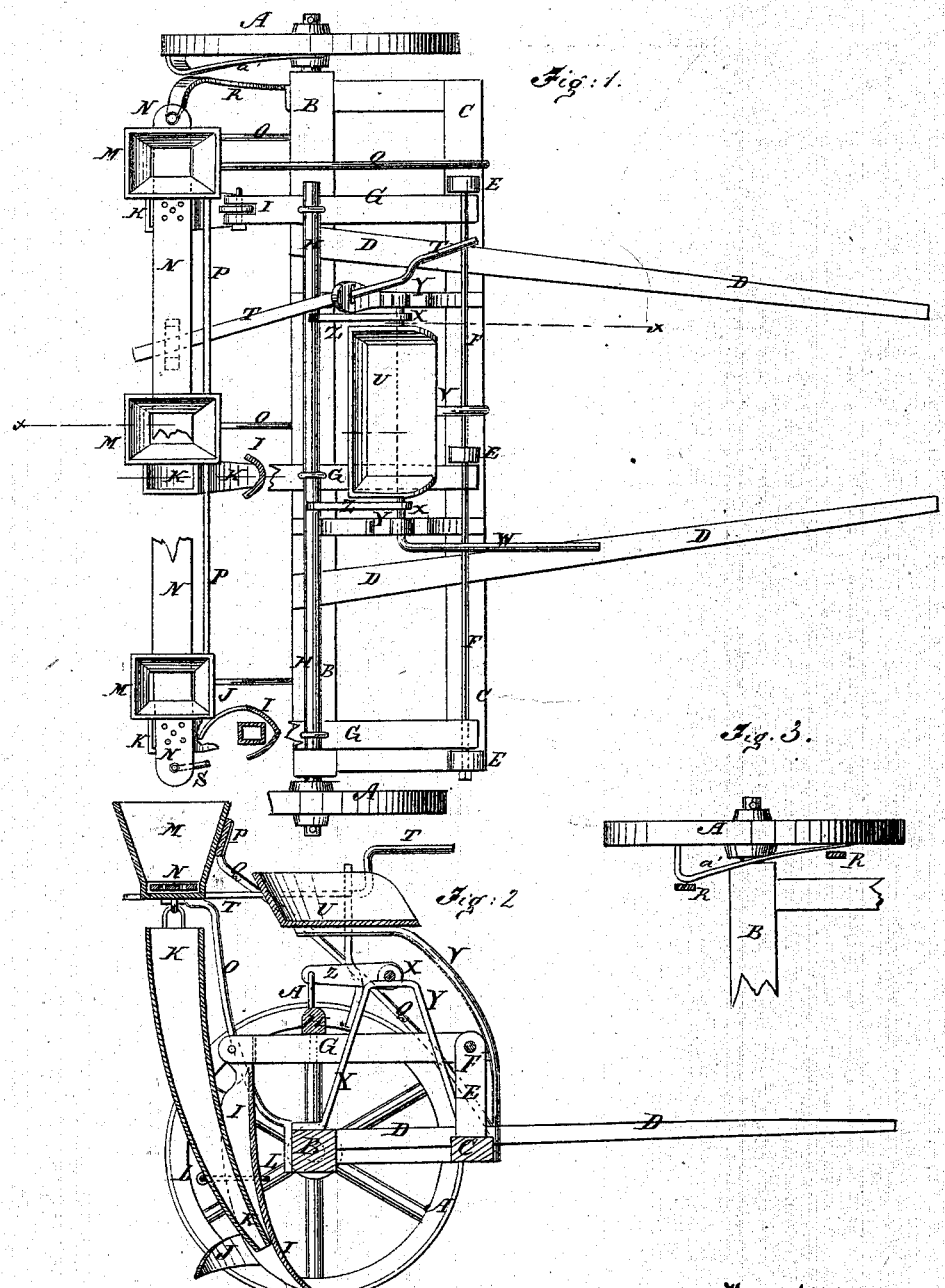

E. CHAPMAN GAGE, OF WITOKA, MINNESOTA.

IMPROVEMENT IN CORN-PLANTERS.

Specification forming part of Letters Patent No. 146,060, dated December 30, 1873; application filed December 31, 1872.

*To all whom it may concern:*

Be it known that I, E. CHAPMAN GAGE, of Witoka, in the county of Winona and State of Minnesota, have invented a new and useful Improvement in Corn-Planters, of which the following is a specification:

Figure 1 is a top view of my improved corn-planter, parts being broken away to show the construction. Fig. 2 is a detail section of the same, taken through the irregular line $x$ $x$, Fig. 1. Fig. 3 is a detail view of one of the wheels, showing the incline for operating the dropping-slide.

Similar letters of reference indicate corresponding parts.

This invention consists in the improvement of corn-planters, as hereinafter described, and pointed out in the claim.

A are the wheels, which revolve upon the journals of the axle B. C is a bar, placed at a little distance in front of, and parallel with, the axle B, and the ends of which are connected with said axle by short bars. D are the shafts, which are securely attached to the axle B and bar C. To the bar C are securely attached three short studs, E, to the upper ends of which are pivoted, by a long rod, F, the forward ends of the drag-bars G. The drag-bars G are connected near their rear ends, and held in proper relative positions, by a bar, H. To the rear end of each of the drag-bars G is pivoted the upper end of the shank of a plow, I, for opening the furrow to receive the seed, which openers are made hollow or open upon their rear sides to receive the lower ends of the spouts K, by which the seed is conducted into the furrows opened by the openers I before said furrows can become partially filled by the falling in of the soil. The seed is covered by the coverers J, which are so formed as to scrape the soil into the furrows, and thus cover the seed and smooth off the ground. The lower parts of the spouts K are connected with the openers I by loose bands L passed around said spouts and openers, as shown in Fig. 2. The upper ends of the spouts K are connected with, and supported from, the bottoms of the seed-hoppers M, in such a position as to receive the seed from the dropping-bar N, which slides upon the bottoms of the hoppers through holes in their sides. The parts of the bar N that pass in and out of the hoppers have holes formed in them to receive the seed, carry it out, and allow it to drop into the spouts K. These holes may be groups of small holes, each large enough to contain a single kernel, and as many in each group as it is desired to plant kernels in a hill; or the hole in each of said parts may be large enough to contain as many kernels as it is desired to plant in a hill. The hoppers M are supported by standards O, the lower ends of which are secured to the axle B. The hoppers M are connected and held in their proper relative position by a cross bar or rod, P, attached to them. The hoppers M may be still further supported in position by one or more braces, Q, the lower ends of which are secured to the frame C. R is a spring-bar, the lower end of which is secured to the axle B, near the wheel A, and its upper end is connected with the end of the dropping-bar N. To the inner side of the wheel A is attached an incline, $a'$, which, at each revolution of said wheel, strikes the spring-bar R and pushes it inward, sliding the dropping-bar N to bring its dropping-holes out of the hoppers and over the conductor-spouts to drop the seed. The bar N is pushed back, to bring its dropping-holes into the hopper again, by the spring S, the upper end of which is connected with the end of the said bar N, and its lower end is securely attached to the axle B. The dropping-bar N may also be operated by hand, if desired, by means of a hand-lever, T, one end of which is connected with said dropping-bar, and which is pivoted to a support attached to the frame-work of the machine. The forward end of the lever T projects into such a position that it can be conveniently reached and operated by the driver from his seat U. The support V for the seat U is attached to the bar C. W is a lever, attached to or formed upon the end of a shaft, X, which works in bearings in supports Y, attached to the frame-work of the machine. To the shaft X are attached arms Z, or segments of pulleys, to which are attached the ends of chains $A'$, the other ends of which are attached to the bar H, so that, by operating the lever W, the openers I may be raised from the ground for convenience in turning or passing from place to place. The lever W may be operated by the driver with his foot.

Each standard of its opening-plow is clamped in a slot of a beam, so as to overcome any ordinary resistance made by loose ground, but so as to give way when any rigid obstacle comes in its path.

Having thus described my invention, I claim as new, and desire to secure by Letters Patent—

The combination of a spout, K, pivoted plow I, and a scraper, J, arranged as described.

E. CHAPMAN GAGE.

Witnesses:
  GEO. THOMAS,
  FRANK ROWLEY.